United States Patent [19]
Larsen et al.

[11] Patent Number: 4,759,668
[45] Date of Patent: Jul. 26, 1988

[54] METHOD AND APPARATUS TO ENHANCE INTERMODAL CONTAINERS FOR CARGO TRANSPORT

[76] Inventors: Stuart A. Larsen, 4831 Proctor Rd., Castro Valley, Calif. 94546; Charles S. Christensen, Jr., 3145 Somerset Pl., LaFayette, Calif. 94549

[21] Appl. No.: 947,870

[22] Filed: Dec. 30, 1986

[51] Int. Cl.⁴ .............................................. B60P 3/07
[52] U.S. Cl. .......................................... 410/26; 410/24
[58] Field of Search ..................... 410/3, 4, 7, 8, 13, 410/17, 18, 24, 25, 26; 414/234, 239, 240; 105/370; 244/118.1; 212/116; 104/249, 250, 254, 257; 384/19, 50, 57, 58, 202, 518, 546

[56] References Cited

U.S. PATENT DOCUMENTS

| | | | |
|---|---|---|---|
| 1,171,801 | 2/1916 | Osterhout | 212/116 |
| 1,263,788 | 4/1918 | Michod | 410/25 |
| 1,745,982 | 2/1930 | Copony | 410/25 |
| 1,749,758 | 3/1930 | Copony | 410/25 |
| 1,805,881 | 5/1931 | Musselman | 410/17 |
| 1,824,369 | 9/1931 | Reid et al. | 410/24 |
| 1,824,983 | 9/1931 | Copony | 410/17 |
| 1,869,054 | 7/1932 | Evans | 410/18 |
| 1,892,589 | 12/1932 | Snyder | 410/24 |
| 1,934,841 | 11/1933 | Copony | 410/25 |
| 1,965,525 | 7/1934 | Roscher et al. | 410/25 |
| 1,969,434 | 8/1934 | Snyder | 410/18 |
| 1,978,287 | 10/1934 | Thomas | 410/15 |
| 1,994,695 | 3/1935 | Dolan et al. | 105/368 |
| 2,009,149 | 7/1935 | Pierce | 410/29 |
| 2,010,846 | 8/1935 | Butterworth | 410/17 |
| 2,035,772 | 3/1936 | Tobin | 410/25 |
| 2,036,212 | 4/1936 | Gwatkin | 410/25 |
| 2,068,460 | 1/1937 | Nampa | 410/15 |
| 2,492,980 | 1/1950 | Garnett | 410/29 |
| 2,617,368 | 11/1952 | McCormick | 410/29 |
| 2,834,631 | 5/1958 | Taraldsen | 410/29 |
| 2,838,338 | 6/1958 | Kerley et al. | 410/28.1 |
| 2,860,910 | 11/1958 | Risner | 410/28.1 |
| 2,918,326 | 12/1959 | Antaramian | 410/29.1 |
| 3,145,043 | 8/1964 | Gyori et al. | 410/28.1 |
| 3,180,283 | 4/1965 | Sharp | 410/26 |
| 3,199,930 | 8/1965 | Carleton et al. | 384/202 |
| 3,240,167 | 3/1966 | Podesta et al. | 105/370 |
| 3,361,489 | 1/1968 | Gionet | 384/19 |
| 3,498,480 | 3/1970 | Gutridge | 410/26 |
| 3,511,392 | 5/1970 | Blunden et al. | 410/24 |
| 3,650,416 | 3/1972 | Bodenheimer | 410/29.1 |
| 3,675,795 | 7/1972 | Dluhy | 410/24 |
| 3,739,906 | 6/1973 | Cwycyshyn et al. | 410/13 |
| 3,874,748 | 4/1975 | Figueroa | 384/19 |
| 3,941,064 | 3/1976 | Choly | 410/13 |
| 4,047,597 | 9/1977 | Okura et al. | 384/33 |
| 4,455,119 | 6/1984 | Smith | 410/28.1 |

FOREIGN PATENT DOCUMENTS

| | | | |
|---|---|---|---|
| 164626 | 8/1955 | Australia | 244/118.1 |
| 975951 | 3/1951 | France | 244/118.1 |

Primary Examiner—Joseph F. Peters, Jr.
Assistant Examiner—Thomas J. Brahan
Attorney, Agent, or Firm—Burns, Doane, Swecker & Mathis

[57] ABSTRACT

Method and apparatus to enhance intermodal containers for transport of vehicles wherein multiple longitudinal rails on container walls support movable and removable transverse cargo pallets having foot members which are articulatably connected to the pallets are disclosed. Cargo, preferably an automobile fixed to front and rear pallets is loaded by inserting each pallet's feet onto appropriate rail(s) at door opening, then sliding to stowage spot, the rail selection determining height and tilt. Stowage of any mix of automobiles in intermodal containers is optimized by double-decking, half-decking, double half-decking, mirror-imaging, and envelope intervention. On back haul, pallets serve other cargo as restraints, hangers, pallets, or dunnage deck supports, or they are stowed out of the way. Method and apparatus permit automated load planning and container stuffing, and make containerized shipment of large volumes of automobiles cost competitive with current methods.

14 Claims, 5 Drawing Sheets

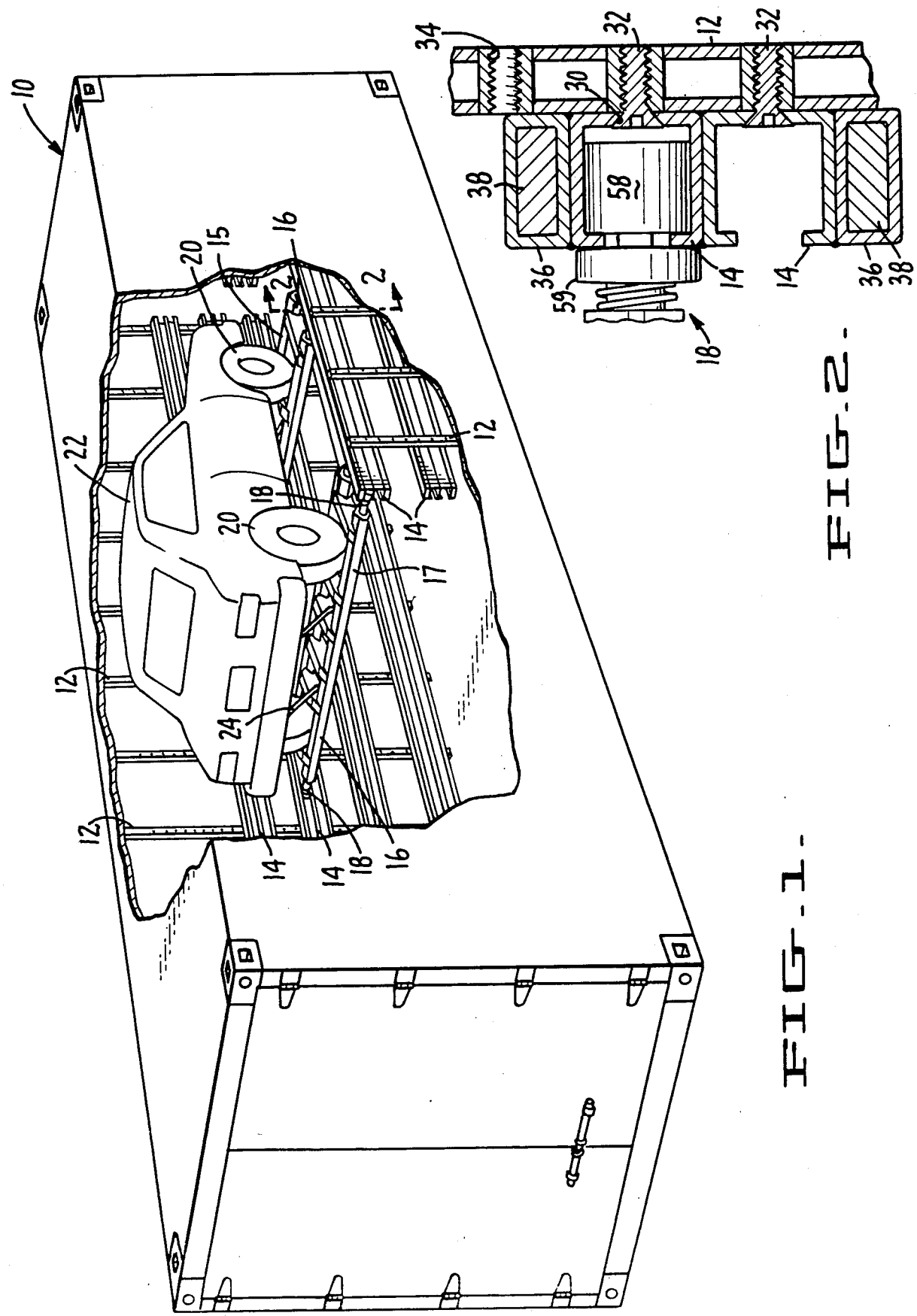

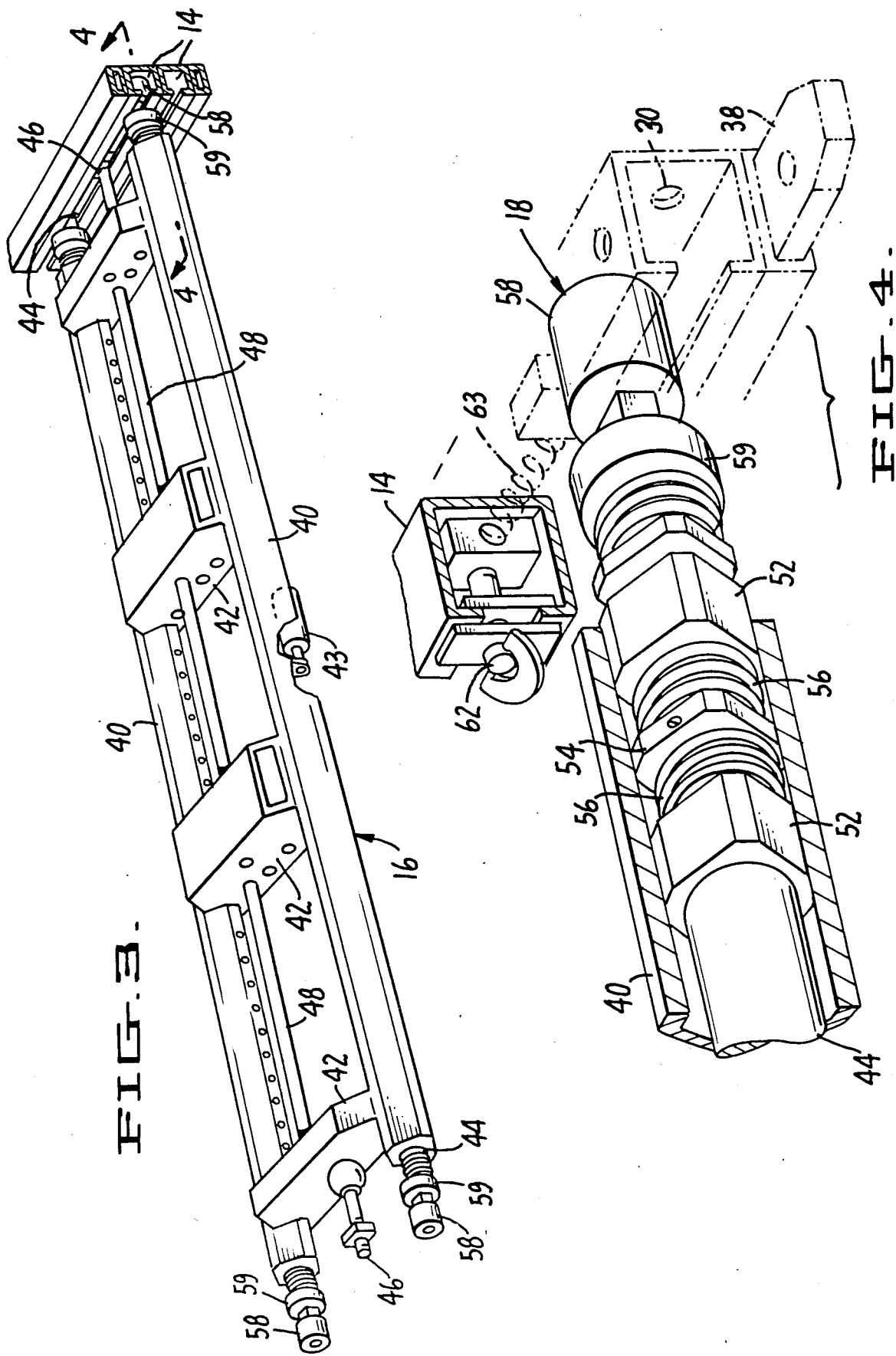

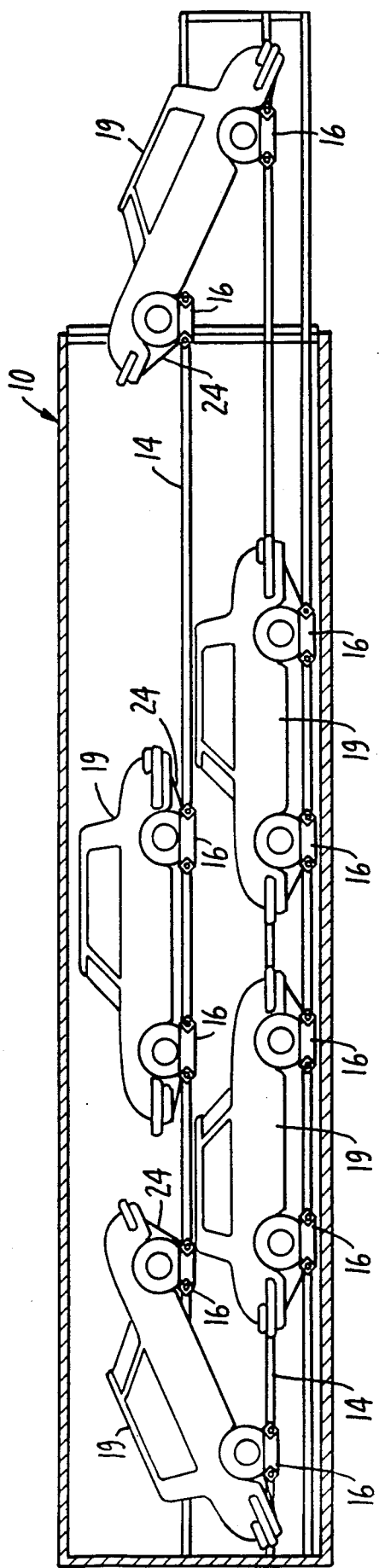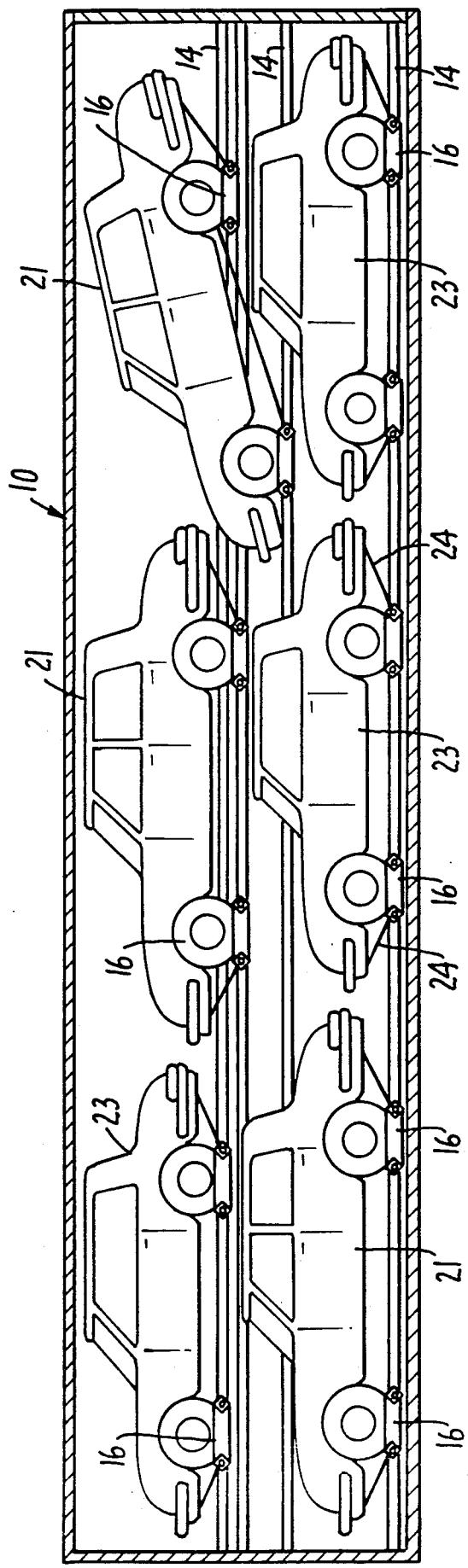

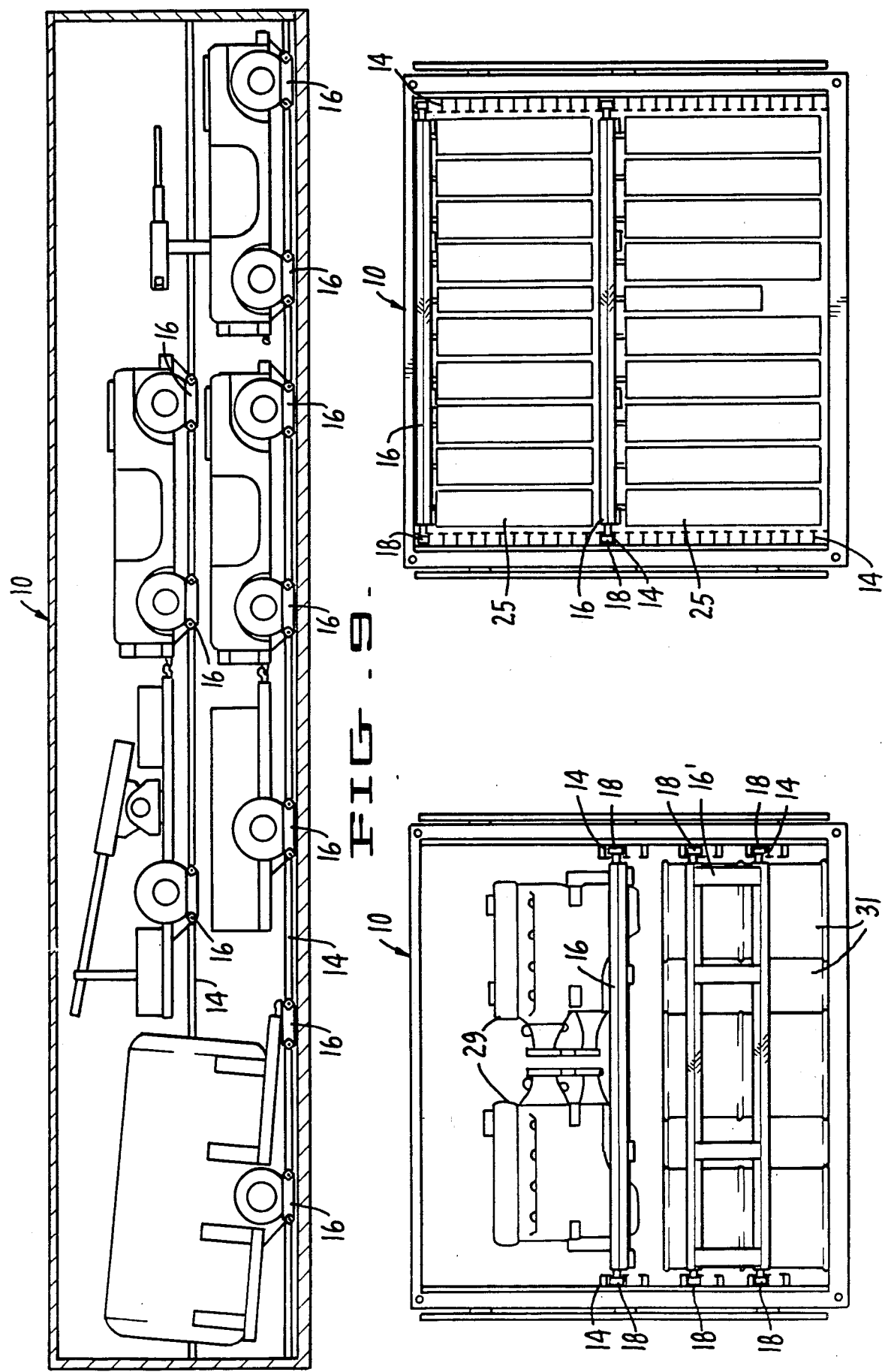

METHOD AND APPARATUS TO ENHANCE INTERMODAL CONTAINERS FOR CARGO TRANSPORT

BACKGROUND OF THE INVENTION

1. Field of the Invention

This invention relates generally to the stowage of bulky, odd-shaped, uncrated or unstackable units in intermodal shipping containers. It relates particularly to a system for containerized shipment of automobiles.

2. Discussion of the Prior Art

Current systems for transport of imported automobiles generally utilize special purpose ships, railroad cars, and truck-trailers. Individually, these conveyances carry automobiles very efficiently; when viewed as a system however, they have significant drawbacks.

(1) Back haul inefficiency—Specialty car-carrier ships, railcars and truck-trailers are ill-suited for other types of cargo; normally they return empty.

(2) Mode-change inefficiency—Specialized ships used for automobile imports carry thousands of automobiles on each voyage. Imported automobiles must typically make two such mode changes en route, and perhaps one or two more between train and truck. At each one, they are driven off and on the conveyances and are parked in a holding area. Such mode changes are labor intensive, damage-prone and time-consuming.

(3) Transport time inefficiency—Generally, European automobiles exported to the U.S. West Coast and Asian automobiles exported to the East Coast are carried by ship through the Panama Canal. By contrast, containerized cargo is landed on the near coast and shipped by rail to the opposite coast on special container trains, saving a week or more in transit. Time saved is even greater for inland points.

(4) Marketing inefficiency—The excess time lag between manufacture of an import automobile and its receipt by a dealer due to current shipping methods, causes an attendant lag in adjustment of production orders to meet changing market demands.

Despite the substantial savings in handling costs, pilferage, damage and overall transit time normally associated with containerized shipment of freight, automobiles imported in large volume do not use this method. Compared with the current system outlined above, containerized transport of automobiles is too costly because of very poor cube utilization. Using current practice, only two or three automobiles or equivalent-sized vehicles are stowed in a 40-foot intermodal container (see U.S. Pat. No. 3,675,795). As a result, the container neither "weighs out" nor "cubes out". Shipping racks resembling truck-trailer car-carriers, specially made to fit container slots aboard ship, achieve better cube utilization (see U.S. Pat. No. 3,650,416), but because of added expense and lack of back haul cargo, these costly special purpose car-carrier racks have not proved to be a viable alternative for high volume automobile shipments.

In the past, several mechanisms have been developed to increase the number of automobiles stowed longitudinally in container-like conveyances whose dimensions are limited by highway and/or railway length, width and height constraints. All accomplish this by double-decking and/or tilting automobiles at an angle (i.e., half-decking) using various types of supports. These mechanisms may be classified into seven classes, according to the conceptual method of support.

(1) Fixed and/or movable wheel ramps are provided in the conveyance, on which automobiles roll to stowage position and are supported (See U.S. Pat. Nos. 4,455,119; 3,941,064; 3,739,906; 3,650,416; 3,145,043; 2,860,910; 2,838,338, 2,834,631, 2,492,980, 2,009,149 and 1,994,695).

(2) Wheel ramps are provided in the conveyance. After automobiles are rolled onto the ramps, they are inclined to stowage position by integrated hydraulic or mechanical lifting means (see U.S. Pat. Nos. 2,918,326 and 2,617,368).

(3) Inclinable wheel ramp assemblies are provided outside the conveyance (see U.S. Pat. No. 3,675,795). Each assembly is inclined and locked in stowage attitude with one automobile on it. Assemblies are then rolled longitudinally into the conveyance and along its floor to stowage positions.

(4) Various types of adjustable supports are installed inside the conveyance to hold automobiles hoisted to various heights off the stowage floor (see U.S. Pat. Nos. 2,068,460; 2,035,772 and 1,978,287).

(5) Supports similar in concept to those in (4) above but which are movable longitudinally on tracks within the conveyance before automobiles are lifted onto them (see U.S. Pat. Nos. 2,036,212; 2,010,846; 1,969,434, 1,965,525; 1,934,841; 1,869,054; 1,824,983; 1,805,881 and 1,745,982).

(6) Supports similar in concept to those in (5) above but which are movable longitudinally to storage position within the conveyance after automobiles have been lifted onto them (see U.S. Pat. Nos. 1,892,589; 1,749,758 and 1,263,788).

(7) U.S. Pat. No. 1,824,369 is similar in concept, but it incorporates a means for raising one end of an automobile to inclined position within the space before resting it upon supports. The supports can then be moved longitudinally to stowage positions.

None of the prior art mechanisms incorporates the novel concept of vehicle supports which are movable longitudinally along a plurality of longitudinal rails installed at or movable to many heights above the conveyance floor. Nor is any of them intended to carry automobiles tilted not only longitudinally but also transversely so as to maximize cube utilization of the stowage space. All of the mechanisms represent labor intensive methods of stowing automobiles which do not lend themselves to automated loading. In addition, they hold significant potential for cargo damage and personnel injury. All but one of the mechanisms requires positioning an automobile inside the conveyance before lifting it to stowage position.

The method disclosed in U.S. Pat. No. 3,675,795 does allow lifting one end of the automobile to stowage attitude on a supporting rack outside the conveyance, then moving the loaded supporting ramp longitudinally along the stowage floor to stowage position. However, it does not take into consideration multiple level rails and independent pallets and therefore does not allow complete suspension of one automobile over another, being limited to stowage of automobiles with one (or both) pair(s) of wheels at deck level. This lack of flexibility in positioning automobiles limits cube utilization. Practical problems with this approach include the ramp's bulk, cost of returning ramps for reuse, and damage caused by collapsed ramps.

As evidenced by current practice, none of the known methods and apparatus or variations on them served to make containerized shipment cost competitive for large volumes of automobiles.

SUMMARY OF THE INVENTION

The purpose of the instant invention is to provide a method and apparatus to enhance intermodal containers for the carriage of cargo, especially automobiles.

To accomplish this purpose, the instant invention provides a method of attaching cargo pallets to a cargo load (e.g., an automobile) outside of the container and subsequently loading the cargo into the container at a desired angle and translating the cargo to the desired stowage position. The apparatus of the instant invention provides a plurality of rails within the container and removable cargo pallets which are insertable onto and engagable with the rails at various angles and levels, said pallets being translatable along said rails to a position where they may be secured within the container. Typically, the method comprises the following step: (1) a load is attached to pallets front and rear; (2) the pallet-borne load is raised and inclined (as necessary); (3) the pallet-borne load is moved into the container until pallet foot means are inserted onto longitudinal rails at the desired stowage height and angle (if the load is an automobile, for example, and is inclined longitudinally, the rear foot means would rest on higher or lower rails than the forward ones, if inclined laterally, the right foot means would rest upon higher or lower rails than the left foot means); (4) the pallet-borne load is then translated along the rails to its longitudinal stowage spot; (5) the load and pallets are firmly secured in position; (6) additional loads are stowed in the same manner; (7) the foregoing steps constitute "stuffing" the container, it is "unstuffed" by reversing them.

The apparatus generally comprises: (1) longitudinally oriented rails affixed by some appropriate means to opposite sides of the container, or incorporated in the structure of the sides, or carried on vertical supports affixed parallel to the sides; rails are open at the ends thereof and are shaped in such a way that the foot means referred to below are preferably held transversely captive; (2) removable pallets supporting the load inside a container; (3) foot means articulatably attached to a pallet supporting it at various heights and angles upon a pair of longitudinal rails; foot means adjust automatically for nominal changes in vertical or transverse alignment of the rails as load bearing means (which are a part of the foot means) move along the rails; foot means also may be adjustable to match varying distances between rails; the foot means includes load bearing means, e.g., rollers or shoes fitted with friction reducing means roll, slide or glide on the rails when the pallet is burdened; (4) tie-down means to secure automobiles to pallets for shipment; (5) means to fix pallets in place for shipment; and (6) optional drip aprons removably attached under automobiles to collect any leaking fluids.

In one aspect of the invention there is provided apparatus for enhancing the transport capability of an intermodal container to permit stowing cargo at various heights and angles, said container having a floor, sides, at least one opening end, and longitudinal, transverse and vertical axes, said apparatus comprising: a plurality of longitudinally oriented rails mountable in pairs within a container above the container floor, said rails being vertically spaced from each other and generally parallel to each other, said rails being generally at right angles to an opening end of a container to be enhanced, said rails having ends and at least one of said ends being open adjacent the opening end of a container to be enhanced; and a first cargo pallet having a first pair of foot means, said foot means being complementary to said rails and capable of being inserted from outside a container onto the open ends of said rails and translated along said rails, said pallet being capable of engaging rails at various heights and angles with respect to said axes permitting insertion of pallet-borne cargo at a desired height and angle and translation of cargo to a desired stowage position.

In yet another aspect of the invention there is provided a method to enhance the transport capability of an intermodal container comprising the steps of: (a) providing an intermodal container having a floor, sides, at least one opening end, and longitudinal, transverse and vertical axes and having a plurality of longitudinally oriented rails mountable in pairs within the container above the container floor, said rails being vertically spaced from each other and generally parallel to each other, said rails being generally at right angles to the opening end of said container, said rails having ends and at least one of said ends being open adjacent the opening end of said container; (b) providing first and second cargo pallets, each having a plurality of foot means, said foot means being complementary to said rails and capable of being inserted from outside said container onto the open ends of said rails and translated along said rails, said pallet being capable of engaging rails at various heights and angles with respect to said axes; (c) attaching a load to said pallets outside said container; (d) lifting and inclining said load and pallet and inserting said foot means of said first pallet onto the rails; (e) moving said load and first pallet into said container; (f) independently inclining and lifting said load and said second pallet and inserting its foot means onto said rails;(g) translating said pallets to a desired longitudinal position; and (h) securing said pallets with respect to said rails in a stowage position.

BRIEF DESCRIPTION OF THE DRAWINGS

FIG. 1 is a cutaway perspective view of an intermodal container which has been enhanced for the carriage of automobiles by the apparatus of the instant invention.

FIG. 2 is a partial, cross-sectional view taken along section lines 2—2 in FIG. 1 of a two rail cartridge showing its attachment to a section of vertical support.

FIG. 3 is a perspective view of an automobile pallet with foot means on one end resting on a cutaway section of longitudinal rail.

FIG. 4 is a partial perspective, cross-sectional view taken along section lines 4—4 in FIG. 3 of one end of a pallet's transverse member with load bearing means (roller) resting on a section of longitudinal rail. The transverse member is cut-away to show the majority of the foot means including its bearing shaft, thrust collar, thrust springs, drag alignment guide, and load bearing means (roller). Attachment means for the bearing shaft is shown.

FIG. 5 is a sectional side view of an intermodal shipping container, showing automobiles stowed inside on transverse pallets riding on multiple longitudinal rails, with another automobile being stuffed. Illustrated are double-decking, half-decking and mirror-imaging and generally the independent inclining and lifting of the automobiles because of the multiple rails and pallets.

FIG. 6 is an enlarged sectional side view of an intermodal container carrying two sizes of automobiles from one manufacturer. Illustrated are double-decking, double half-decking and envelope intervention.

FIG. 9 is a sectional side view of an intermodal container carrying an assortment of military vehicles.

FIG. 10 is an end view of a container using the enhancement system of the instant invention to carry various types of cargo.

FIG. 11 is an end view similar to FIG. 10 of a container using the enhancement system to carry another type of cargo.

DESCRIPTION OF THE PREFERRED EMBODIMENT

Figure 8:
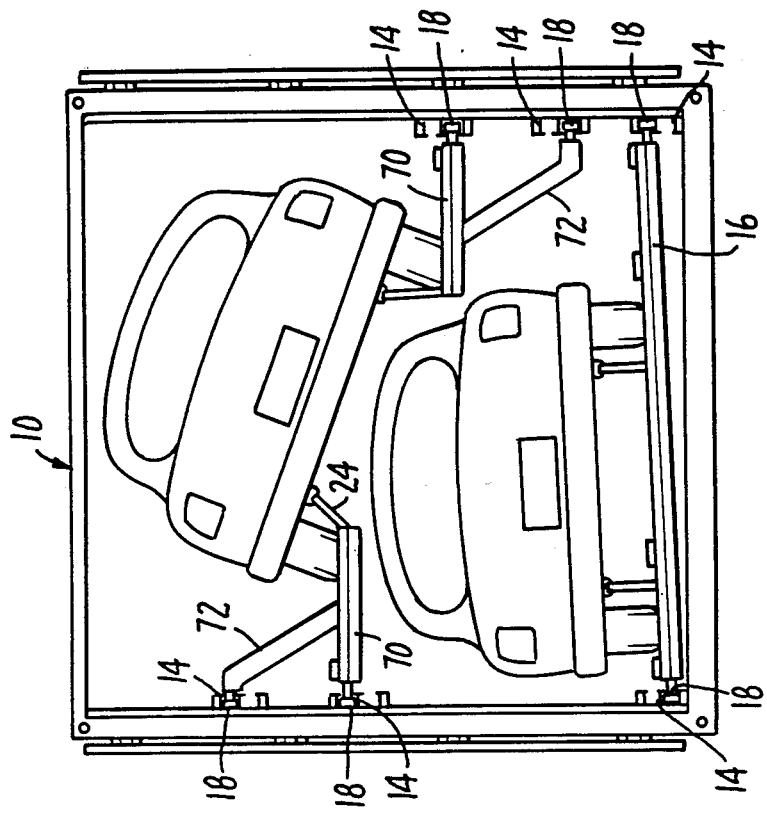
FIG. 8 is an end view of an open container fitted with longitudinally oriented rails and alternative "single side" pallets which are supported by rails on one side of the container only. This figure also shows two automobiles stowed with transverse inclination, one mounted on transverse pallets, the other on single side pallets. The single side pallet's supplemental brace member is also shown.

With continued reference to the drawing, FIG. 1 illustrates an intermodal shipping container shown generally at 10 which is fitted with vertical supports 12 mounted parallel to or integral with the container wall. Multiple longitudinally oriented rails 14 are permanently or removably fixed to the vertical supports 12. Transverse cargo pallets 16 fitted with articulated foot means 18 can rest upon and translate along opposing pairs of longitudinal rails. Each pallet 16 (which may be defined as first and second cargo pallets 15 and 17, respectively) supports the front or rear wheels 20 of an automobile 22. An automobile is secured to pallets 16 by known means of tie-down 24. An apron (not shown) may be fitted under it to catch any leaking fluids. Loaded pallets 16 are lifted and moved inward, until the foot means 18 of the first pallet 15 is supported by opposing rails 14; the first pallet 15 is translated further in while the second pallet 17 is raised or lowered, as necessary, until the foot means 18 of the second pallet 17 is supported by the same or a different pair of opposing rails; the loaded pallets are then translated to their predetermined stowage position and secured by appropriate means for transport.

In FIGS. 2 and 4, the longitudinal rails 14 in the preferred embodiment are a common square section structural channel with regularly spaced anchor holes 30 in the web. Each rail 14 is bolted to vertical supports 12 using rail attachment bolts 32 through the anchor holes 30 into vertical support threaded sockets 34. FIG. 2 shows a sectional view of a rail cartridge having two longitudinal rails 14; above the upper rail and below the lower rail are stiffeners 36; the rails 14 and stiffeners 36 are fixed together and cut to appropriate length. Where two cartridges abut longitudinally, rail alignment is assured by tight fitting tongues 38 inserted in the ends of the stiffeners 36. These tongues and stiffeners together with the rollers and drag alignment guides of the pallet foot means aid alignment of the pallet with the rails when stuffing the pallet into the container. Cartridges can be made up with any needed number of rails cut to appropriate length. The number of rails and length of cartridge will be influenced by weight of the assembly, length of the container in which they are to be used, and means by which cartridges are to be vertically moved. Longitudinal rails may be individually attached to vertical supports (or directly to container sides if structurally adequate) as they would be if rails are used for the full height of the container side. In most applications, however, it would be more economical to use two or three sets of multiple rail cartridges manually bolted at appropriate heights for the mix of automobiles to be carried. The cartridges could be unbolted and rebolted at the appropriate heights for the mix of vehicles to be stuffed. Mechanical or powered means to vertically raise and lower cartridges could be installed when economically warranted. It is even feasible using known art to install means to vertically raise and lower cartridges while burdened with cargo; in some applications, it may be desirable to install known integral lift means so that no special external lift is required.

In FIG. 3, the automobile cargo pallet shown generally at 16 is fabricated in a ladder-like structure with two long transverse members 40 and short longitudinal rungs incorporating lift attachment means 42 with heavy lift rollers 43. An articulated foot means 18 with bearing shaft 44, weight bearing means shown to be a roller 58, and drag alignment guide 59 are mounted in both ends of each transverse member 40. "Articulation" is herein defined as means allowing relative motion among the components such as by hinging, sliding, etc., as necessary to incline the pallet. It can be appreciated that alternative foot means construction, e.g., sliding shoes (not shown) will require compatible articulated connections to allow the pallet to engage rails at various heights and angles with respect to the longitudinal, transverse and vertical axes. It is also within the scope of the invention to utilize foot means that are not articulated where not required by the container configuration, etc. The outboard longitudinal rungs are fitted with extensible pallet anchor bolts 46 to secure the pallet in anchor holes 30. Wheel size adjusters 48 are fitted in the pallet to adjust for different size automobile wheels (e.g., 13-inch to 16-inch) and tires.

In FIG. 4, articulated foot means shown generally at 18 comprises bearing shaft 44, thrust collar 54, thrust springs 56, weight bearing means 58 and drag alignment guide 59. The weight bearing means 58 comprises a roller. The bearing shaft 44 is supported inside the transverse member 40 by two bearings 52 which permit rotation and axial motion; the movable thrust collar 54 attached to the bearing shaft 44 between bearings 52, acting on two thrust springs 56, permits presetting and maintains extension of the foot means from the transverse member 40. The thrust collars 54 on the four bearing shafts 44 are set to position the distance between rollers to match the distance between pairs of longitudinal rails 14 on which they ride in the container to be used; the setting of the thrust collars 54 can also be used to bias the springs 56 to push the rollers outward or pull them inward. The thrust springs 56 also allow restrained movement of the foot means 18 in and out of the transverse member 40; this movement, plus the freedom of the shaft 44 to rotate in the shaft bearings 52, permit the weight bearing means 58 (roller in this embodiment) to articulate and follow nominal vertical and lateral bends in the longitudinal rail and to absorb shock to the pallet along the transverse axis. The roller 58 facilitates movement along the rail when burdened.

It is within the scope of the invention to place longitudinal spring means in the form of springs 63 in the rails 14 between rollers 58 and stop means in the form of positive stop bolts 62 contacting rails 14, positioned ahead of or behind the rollers; together the stop means and longitudinal spring means serve to position the pallet, absorb shock along the longitudinal axis and/or secure it in place. Springs 63 are shown in phantom in FIG. 4 and define only one form of spring means. Other spring means such as blocks of resilient material, hydraulic means, etc., are also within the scope of the invention.

FIG. 4 also illustrates the mounting of roller 58 at the outer end of foot means 18. The roller 58 remains captive within the longitudinal rail 14 when the pallet is in the container because of its size and shape relative to that of the rail. The roller permits longitudinal movement of the pallet along the rails. A movable drag alignment guide 59 is adjustably fixed on the foot means 18 so it can be telescoped inward and outward thus widening or narrowing the gap between its outer face and the roller 58; when stuffing a pallet 16 the drag alignment guide 59 is positioned so that the gap between its outer face and the roller is greater than the wall thickness of the longitudinal rail 14, at the same time the thrust collars 54 are set so that the distance between the outer faces of drag alignment guides 59 on opposite ends of the pallet 16 are roughly equal to the distance between the inner faces of opposing longitudinal rails 14. When so adjusted, the drag alignment guide 59, working in concert with the alignment tongue 38, facilitate threading the roller 58 into the end of the longitudinal rail 14. Once the pallet 16 is railborne, the drag alignment guide 59 may be adjusted to provide drag necessary to retard and maintain control of the laden pallet 16 when in motion; it will also keep the pallet from becoming cocked between the longitudinal rails 14. Rails 14 have incrementally spaced anchor holes 30; vertical supports 12 have like-spaced threaded holes 34 to which the rails may be bolted. Together these holes form an adjustable incremental grid which may be used to position pallet borne cargo such as automobiles with great precision. Anchor holes 30 used to bolt the longitudinal rail to the vertical support are blocked from use by the positive stop bolts 62. The positive stop bolts may be used in conjunction with longitudinally oriented springs 63 to secure the pallet 16 in place. Alternatively, the positive stop bolts 62 have integral D-rings that may be used for common cargo tie-down means.

It is also within the scope of this invention to use a shoe form of bearing means instead of the roller 58. Such a shoe (not shown) would fit within the longitudinal rail 14, would be attached to the foot means 18 with a vertical pin, would have a low friction base to facilitate movement along the rail 14 when burdened and could be fitted with threaded holes for anchor bolts. The freedom of motion of the shoe about the vertical pin and the freedom of the shaft to rotate in the shaft bearings would permit the shoe to follow nominal vertical and lateral bends in the longitudinal rail.

FIGS. 5, 6 and 9 show the flexibility of this system of rails and first and second cargo pallets in stowing vehicles. They may be stowed double-decked, half-decked, double half-decked, mirror-imaged (i.e., inserted frontward or backward) and with envelope intervention (e.g., part of the roof of one automobile intrudes into the space between another automobile's wheels). The figures show only a few of myriad possibilities. FIG. 5 shows five compact sedans 19 being stowed in an intermodal container. With regard to the automobile entering the container, it can be appreciated that the load was attached to pallets outside of the container, was lifted and inclined the first pallet inserted onto the rails, the load and second pallet capable of being independently lifted and inclined before insertion onto the rails. FIG. 6 shows six automobiles of two different sizes 21 and 23 stowed in an intermodal container. FIG. 9 shows assorted military vehicles stowed in an intermodal container.

Figure 7:
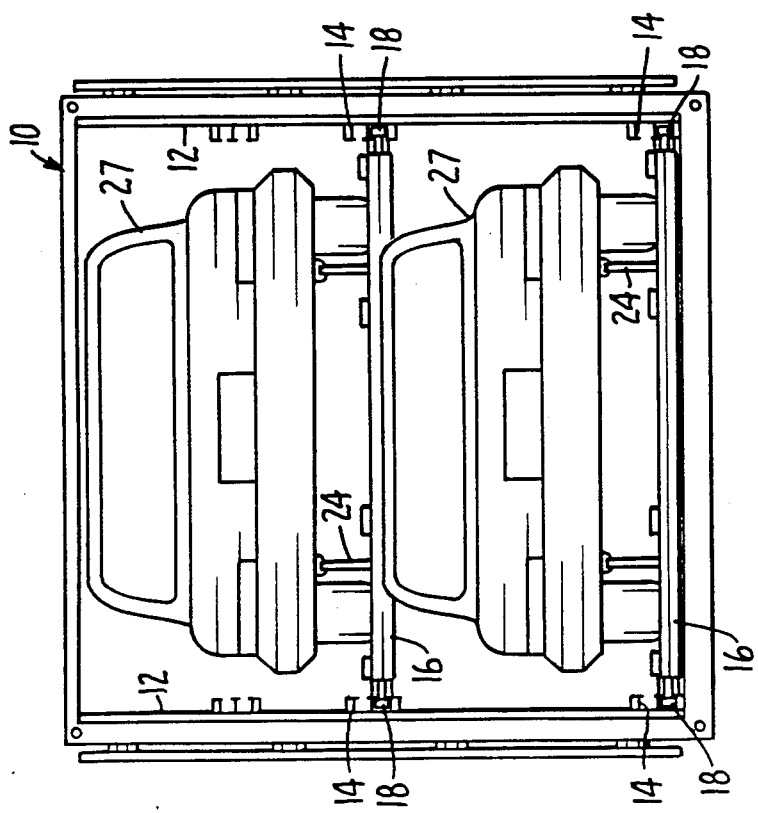
FIG. 7 is an end view of an open container with longitudinally oriented rails and cargo pallets supporting automobiles.

FIGS. 7, 10 and 11 show the flexibility of this system to stow different types of cargo. In FIG. 7, the container is carrying automobiles 27. In FIG. 10 the container is carrying engine/transaxle units 29 and drummed cargo 31 with pallets 16 supporting the engine transaxle units and another pallet 16' mounted vertically as a restraint fence for the drums. FIG. 11 shows a container carrying garments 25 hanging from pallets. These are only a few of many possibilities.

Referring to FIG. 8, the single side pallet 70 is an alternative to the transverse pallet 16 described above. It is suspended from two rails 14 at different elevations on one side of a container. Like the transverse pallet 16, it has load bearing means 58 (rollers or shoes) which ride upon the longitudinal rails 14 and are held transversely captive by them. The load bearing means 58 are mounted to the pallet in a similar manner to that shown for the transverse pallet. Unlike the transverse pallet, each single side pallet would have an additional foot means riding on a longitudinal rail above or below the main foot means, such foot means supporting a brace 72 that provides vertical and lateral support. As shown in FIG. 8, an automobile could be tilted transversely as well as longitudinally using single side pallets; the degree of transverse tilt available using single side pallets would be greater than that using transverse pallets. The foot means of the transverse pallet 16 are articulated and capable of telescoping toward and away from each other allowing the foot means to engage transversely spaced rails at desired spacing with respect to the vertical axis to angle the pallet.

It is readily apparent that utilization of the method and apparatus of the instant invention would permit a greater number of automobiles to be stowed in an intermodal container than is allowed by current art. Further, the innovation of securing an automobile to pallets outside the container then lifting and inclining it to planned stowage height and angle before or while inserting it onto container rails, simplifies stuffing procedures, minimizes risk of damage to automobiles, reduces risk of personnel injury, and would permit full or partial automation of stuffing and/or unstuffing. Finally, the multiplicity of possible vertical and longitudinal anchorage points makes feasible the use of a location coding system and automated load planning for optimal utilization of containers, thus allowing direct interface with computer assisted stuffing programs, traffic management programs, production programs, and sales programs among others.

The number of longitudinal rails to be used in a container is determined by the specific application. A general purpose container might incorporate longitudinal rails in the structure, one above another for the full height of the side. On the other hand, a dedicated container intended to carry only one size automobile might need only one set of vertically adjustable opposing longitudinal rails. A more flexible approach would be to outfit containers with several sets of multiple rail cartridges, mounted so that they can be raised or lowered to meet the needs of a specific cargo mix. Means to raise and lower rails could be, for example, manual, mechanical or power driven. The means could be made capable of raising or lowering the rails when burdened with loaded pallets, if needed. Alternatively, known means to lift laden pallets directly could be installed.

While the preferred embodiment would use transverse pallets under front and rear wheels extending from one side of the container to the other, an alternative embodiment would use one pallet for each wheel so that four rather than two are required per automobile, for example. Such pallets would be supported by foot means running on longitudinal rails at two levels on one side of the container, and would be triangulated to provide necessary structural integrity.

While the preferred embodiment would use an enclosed intermodal container, the same devices could be erected on intermodal flat racks, gondolas or open frame containers. Likewise, the system could be installed in or on other conveyances such as railcars, road vehicles, aircraft, ships and barges. It would also have application in storage structures, especially where large numbers of automobiles or other odd-shaped items are stored or transshipped.

In operation, an automobile is tied down to two pallets, one under front wheels, another under rear wheels. A drip apron may be attached under the car to catch any leaking fluids. The forward pallet foot means are vertically aligned with one pair of longitudinal rails consisting of one rail on each side of the container, normally at the same height above the container floor but not necessarily so. The foot means are inserted onto the rails and moved in until the foot means of the rear pallet are likewise aligned with the same or another pair of rails. The rear pallet foot means are inserted onto the rails and the automobile is translated to its preselected stowage spot in the container, where it is anchored in place for shipment.

Normally, automobiles will be double-decked, half-decked, double half-decked, mirror-imaged, i.e., inserted frontward and/or backward, and parts of one automobile will intersect the envelope of another, e.g., part of the roof of one automobile may intrude into the space between the wheels of an automobile above. The arrangement of automobiles in each container will be chosen to make the total number of automobiles available for shipment fit into the minimum total number of containers. The height, attitude, order of insertion, and longitudinal position of automobiles in each container will be predetermined by a load plan.

A container will be unstuffed by reversing the stuffing process above.

On the back haul, the automobile pallets can be used for hanging cargo such as garments, as pallets for other types of cargo, as supports for dunnage decks, or as restraint fences for cargo by mounting them in a vertical plane between longitudinal rails rather than longitudinally. If not useful in the stowage of back haul cargo, automobile pallets can be secured out of the way on longitudinal rails just below the overhead or at the closed end of the container; if the container is properly configured, empty pallets could be stowed within the floor frame. Alternatively, the entire apparatus (pallets, rails and/or vertical supports) from several containers could be consolidated into a single container for return. Pallets in the preferred embodiment are configured to nest in one another so as to facilitate their stowage on the back haul.

While the preferred embodiment uses pallets upon which an automobile's wheels rest, alternative embodiments would use pallets to which an automobile's body structure, chassis or undercarriage can be secured by appropriate means.

While the preferred embodiment uses a plurality of pallets for each automobile, an alternative embodiment would use a long single pallet for an automobile; if fitted with shoes, such shoes could be rotated to a plane different from that of the pallet so that the forward shoes could ride on one pair of rails and the rear shoes ride upon another, accommodating any vehicle inclination needed. A long pallet could also be made up using two short pallets and pallet connector means.

While the preferred embodiment uses longitudinal rails that run the length of the container, an alternative embodiment would have known lift means incorporated to raise or lower a laden pallet, either directly or by raising the rails or rail segments on which the pallet is resting. This embodiment would be useful, for example, when stuffing and unstuffing vehicles of a military unit where special lifting equipment is not available.

Other embodiments of the invention would use like devices to enhance stowage of any uncrated, odd-shaped, unstackable, or bulky items in a rectahedron (i.e., solid figure having six rectangular sides) or other generally rectahedral space as might be found in intermodal containers, aircraft, ships, barges, highway vehicles and warehouses.

While the preferred embodiment moves palletized vehicles in and out of a container on the longitudinal rails, it would also be possible to carry vehicles by using pallets in fixed position as supports for wheel ramps. Pallets could be positioned at planned height and longitudinal location, ramps would be rested on them, and vehicles rolled or driven in and out on the ramps. After vehicles are positioned on pallets, ramps might be removed. Likewise, the bottom tier of vehicles could be rolled or driven in on the container floor; single transverse bars fitted with foot means could be used to block their wheels. Such single transverse bars could also be used rather than pallets to support wheel ramps; in this case, the ramps must remain in place to support loaded vehicles.

Although the above description is directed to a preferred embodiment of the invention, it is noted that other variations and modifications will be apparent to those skilled in the art, and therefore, may be made without departing from the spirit and scope of the present disclosure.

What is claimed is:

1. Apparatus for enhancing the transport capability of an intermodal container to permit stowing cargo at various heights and angles, said container having a floor, sides, at least one opening end, and longitudinal, transverse and vertical axes, said apparatus comprising:

a plurality of longitudinally oriented rails mountable in pairs within a container above the container floor, said rails being vertically spaced from each other and generally parallel to each other, said rails being generally at right angles to an opening end of a container to be enhanced, said rails having ends and at least one of said ends being open adjacent the opening end of a container to be enhanced; and a plurality of cargo pallets, each pallet having foot means, said foot means being complementary to said rails and capable of being inserted from outside a container onto the open ends of said rails and translated along said rails, said foot means being articulable allowing said pallets independent of each other to engage rails at various heights and angles with respect to said rails permitting cargo that may be attached to said pallets to be lifted to a desired height and tilted to a desired angle and translated to a desired position to enhance the cargo capacity of a container.

2. Apparatus as in claim 1 wherein said foot means are capable of sufficiently axially telescoping toward and away from each other so as to accommodate transverse dimensional tolerances in a container and to allow said foot means to engage transversely and vertically spaced rails to angle said pallet with respect to said vertical axes.

3. Apparatus as in claim 2 wherein each of said foot means includes spring means to absorb shock to said pallet along the transverse axis.

4. Apparatus as in claim 2 further including a positive stop means contacting said rails and a longitudinal spring means contacting said stop means and said foot means, said spring means capable of absorbing shock to said pallet along the longitudinal axis.

5. Apparatus as in claim 3 further including a positive stop means contacting said rails and a longitudinal spring means contacting said stop means and said foot means, said spring means capable of absorbing shock to said pallet along the longitudinal axis.

6. Apparatus as in claim 1 wherein each of said foot means includes spring means to absorb shock to said pallet along the transverse axis.

7. Apparatus as in claim 1 further including a positive stop means contacting said rails and a longitudinal spring means contacting said stop means and said foot means, said spring means capable of absorbing shock to said pallet along the longitudinal axis.

8. Apparatus as in claim 1 wherein each of said foot means includes at least one roller in contact with said rails.

9. Apparatus as in claim 1 wherein said rails are capable of being secured to the sides of the container to be enhanced.

10. Apparatus as in claim 9 wherein said rails are vertically movable.

11. Apparatus as in claim 1 further including vertical support means connected to said rails.

12. Apparatus as in claim 11 wherein said rails are vertically movable.

13. Method to enhance the transport capability of an intermodal container comprising the steps of:
 (a) providing an intermodal container having a floor, sides, at least one opening end, and longitudinal, transverse and vertical axes and having a plurality of longitudinally oriented rails mountable in pairs within the container above the container floor, said rails being vertically spaced from each other and generally parallel to each other, said rails being generally at right angles to the opening end of said container, said rails having ends and at least one of said ends being open adjacent the opening end of said container;
 (b) providing first and second cargo pallets, each having foot means, said foot means being complementary to said rails and capable of being inserted from outside said container onto the open ends of said rails and translated along said rails, said pallet being capable of engaging rails at various heights and angles with respect ot said rails;
 (c) placing cargo on said pallets outside said container;
 (d) lifting and inclining said cargo and pallets and inserting said foot means of said first pallet onto the rails;
 (e) moving said cargo and first pallet into said container;
 (f) independently inclining and lifting said cargo and said second pallet and inserting said second pallet's foot means onto said rails;
 (g) translating said pallets to a desired longitudinal position; and
 (h) securing said pallets with respect to said rails in a stowage position.

14. A method as in claim 13 further including the steps of:
 (a) providing additional pallets with foot means:
 (b) placing additional cargo on said additional pallets outside said container; and
 (c) lifting and inclining said additional cargo and pallets and similarly inserting said foot means of said pallets and moving said pallets into said container at a desired height and angle with respect to said earlier loaded cargo to enhance the cargo capacity of the container.

* * * * *